(12) United States Patent
Persson et al.

(10) Patent No.: US 12,555,865 B2
(45) Date of Patent: Feb. 17, 2026

(54) COVER FOR A BATTERY MODULE

(71) Applicant: Volvo Car Corporation, Gothenburg (SE)

(72) Inventors: Klas Persson, Gothenburg (SE); Simone Vizzini, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 287 days.

(21) Appl. No.: 17/195,972

(22) Filed: Mar. 9, 2021

(65) Prior Publication Data
US 2021/0288374 A1 Sep. 16, 2021

Related U.S. Application Data

(60) Provisional application No. 62/989,934, filed on Mar. 16, 2020.

(51) Int. Cl.
*H01M 50/358* (2021.01)
*H01M 10/658* (2014.01)
(Continued)

(52) U.S. Cl.
CPC ....... *H01M 50/276* (2021.01); *H01M 10/658* (2015.04); *H01M 50/209* (2021.01); *H01M 50/358* (2021.01); *H01M 50/394* (2021.01)

(58) Field of Classification Search
CPC ............ H01M 50/276; H01M 10/658; H01M 50/209; H01M 50/358; H01M 50/394
See application file for complete search history.

(56) References Cited

U.S. PATENT DOCUMENTS

| | | |
|---|---|---|
| 6,255,015 B1 | 7/2001 | Corrigan et al. |
| 6,572,999 B1 * | 6/2003 | Stocchiero .......... H01M 50/121 523/134 |

(Continued)

FOREIGN PATENT DOCUMENTS

| | | | |
|---|---|---|---|
| CN | 102203981 A | | 9/2011 |
| CN | 106684287 A | * | 5/2017 |

(Continued)

OTHER PUBLICATIONS

Fu et al. (CN-207368162(U) and using Machine Translation as English version) (Year: 2018).*

(Continued)

*Primary Examiner* — Milton I Cano
*Assistant Examiner* — Joshua P McClure
(74) *Attorney, Agent, or Firm* — Clements Bernard Walker; Christopher L. Bernard

(57) ABSTRACT

A cover for a battery module is disclosed. The cover includes a planar member and vent ports. The planar member is unitarily formed and manufactured from one of a rigid ceramic material and a glass fiber material. The planar member is adapted to couple to and enclose a container for holding one or more battery cells. The vent ports are formed in the planar member and extend therethrough. Each of the vent ports includes an elongated slot shape positioned in the planar member relative to a position for the one or more battery cells in the container to communicate one or more of gases, heat, pressure, and fire from the one or more battery cells to a predetermined region outside of the container. The vent ports are adapted to maintain isolation of busbars connected to the one or more battery cells.

20 Claims, 3 Drawing Sheets

(51) Int. Cl.
  *H01M 50/209* (2021.01)
  *H01M 50/276* (2021.01)
  *H01M 50/30* (2021.01)

(56) References Cited

U.S. PATENT DOCUMENTS

| | | | |
|---|---|---|---|
| 8,592,076 B2 | 11/2013 | Sugita et al. | |
| 8,846,228 B2 | 9/2014 | Streuer et al. | |
| 8,895,177 B2 | 11/2014 | Marchio et al. | |
| 10,158,102 B2* | 12/2018 | Wu | H01M 50/3425 |
| 2005/0170238 A1* | 8/2005 | Abu-Isa | H01M 50/342 |
| | | | 429/82 |
| 2012/0251872 A1* | 10/2012 | Kim | H01M 50/505 |
| | | | 429/159 |
| 2014/0234677 A1* | 8/2014 | Yoon | H01M 50/308 |
| | | | 429/89 |
| 2015/0140369 A1* | 5/2015 | Itoi | H01M 50/204 |
| | | | 429/53 |
| 2015/0214525 A1* | 7/2015 | Lim | H01M 10/0481 |
| | | | 429/53 |
| 2017/0346050 A1 | 11/2017 | Morioka | |
| 2019/0097203 A1* | 3/2019 | Kwag | H01M 50/512 |
| 2019/0288256 A1* | 9/2019 | Qin | H01M 50/367 |
| 2020/0303701 A1* | 9/2020 | Kim | H01M 50/342 |

FOREIGN PATENT DOCUMENTS

| | | | | |
|---|---|---|---|---|
| CN | 207368162 U | * | 5/2018 | |
| CN | 108602437 A | | 9/2018 | |
| EP | 2597699 B1 | | 11/2015 | |
| EP | 3243232 A1 | | 11/2017 | |
| EP | 3390134 A1 | | 10/2018 | |
| JP | 2010205509 A | | 9/2010 | |
| JP | 2015018706 A | | 1/2015 | |
| WO | 2018108371 A1 | | 6/2018 | |
| WO | WO-2019117485 A1 | * | 6/2019 | ........ H01M 10/0486 |

OTHER PUBLICATIONS

ASM Handbook (ASM Handbook, vol. 13A, Corrosion: Fundamentals, Testing, and Protection, 2003 ASM International) (Year: 2003).*
Ahn et al. (WO2019117485 A1 and using Machine Translation as English version) (Year: 2019).*
Chao et al. (Cn 106684287(A) and using Machine Translation as English version) (Year: 2017).*
Nov. 2, 2022 Office Action issued in corresponding CN Application No. 202110280737.3.
Jul. 26, 2021 European Search Report issued on International Application No. 21162738.
Oct. 2, 2023 Communication pursuant to Article 94(3) EPC of the counterpart EP Application No. 21 162 738.5.

* cited by examiner

COVER FOR A BATTERY MODULE

CROSS-REFERENCE TO RELATED APPLICATION

The present disclosure claims the benefit of priority of U.S. Provisional Patent Application No. 62/989,934, filed on Mar. 16, 2020, and entitled "LID ASSEMBLY FOR A BATTERY MODULE," the contents of which are incorporated in full by reference herein.

TECHNICAL FIELD

The present disclosure relates generally to the automotive and battery energy storage fields. More particularly, the present disclosure relates to a cover for a battery module that electrically isolates the enclosed battery cells, insulates surrounding structures from heat and fire propagation during a battery cell failure, and vents any gases released by the battery cells in a controlled manner.

BACKGROUND

Most conventional battery modules enclosing prismatic battery cells utilize a plastic lid, with or without a metal frame, that performs a "finger-proofing" function, electrically isolating the enclosed battery cells and preventing an individual from coming into contact with the associated leads. In the event of a battery cell fire, such plastic lids are prone to melting, exposing surrounding individuals and/or structures to heat and fire, potentially causing injury and/or damage. Even if the plastic lids do not melt, the plastic lids typically inadequately control the venting of gases emanating from the battery cells, potentially leading to the same concerns. This is problematic in automotive and other applications.

It is generally desirable to control a thermal runaway event involving battery cells, such that the spread of fire can be minimized and/or delayed, thereby providing an individual with more time to address and/or distance themself from the thermal runaway event. Often, this is achieved by adding a fire-retardant, insulating sheet or layer to the inside or outside of the plastic lid of a battery module, with cutouts provided around any lid vents utilized. Unfortunately, this increases component complexity, weight, and cost, especially in an automotive context. Thus, an improved battery module is still desired in the art.

The above-described background relating to battery modules and the lids thereof is merely intended to provide a contextual overview of some current issues and is not intended to be exhaustive. Other contextual information may become apparent to those of ordinary skill in the art upon review of the following description of exemplary embodiments.

SUMMARY

The present disclosure provides an improved cover for a battery module that includes a planar member that is integrally manufactured from a ceramic or glass fiber material, such as mica, as a unitary structure. The planar member includes vent ports formed therein that allow any gases/heat/fire vented during a battery cell thermal runaway event to be vented in a preferred, controlled direction and manner. Advantageously, the cover of the present disclosure electrically isolates the enclosed battery cells, and in particular isolates the busbars of the battery module towards the cover, insulates surrounding structures from heat and fire propagation during a battery cell failure, and vents any gases released by the battery cells in a controlled manner. Furthermore, by controlling the venting of gases, pressure built up by hot gasses is also released preventing damage to the battery module, and in particular, to the planar member allowing the planar member to maintain its function of isolating the busbars.

In embodiments, the cover includes one or more shield structures that cover the vent ports and form a channel with the planar member to further vent and direct gases/heat/fire in a controlled manner and insulate surrounding structures. The "box" portion of the battery module may also be manufactured from the same ceramic or glass fiber material, if so desired. In a thermal runaway event, a self-sustaining reaction results in electrolyte being ejected out of one or more battery cells, potentially as well as battery cell material, at a high speed, and at a high temperature (e.g., 1,000 degrees C.), creating a hazard that it is desirable to control/contain on a battery module level, as opposed to a battery cell level. By using a unitarily formed planar member with one or more of elongated slots and a shield structure, this control and containment of hazardous thermal runaway events can be accomplished efficiently and, in a cost effective manner, which is an improvement over the complexity of other solutions.

In one exemplary embodiment, the present disclosure provides a cover for a battery module. The cover includes a planar member and a plurality of vent ports. The planar member is unitarily formed and manufactured from one of a rigid ceramic material and a glass fiber material. The planar member is adapted to couple to and enclose a container for holding one or more battery cells. The plurality of vent ports is formed in the planar member and extend therethrough. Each of the plurality of vent ports includes an elongated slot shape positioned in the planar member relative to a position for the one or more battery cells in the container to communicate one or more of gases, heat, pressure, and fire from the one or more battery cells to a predetermined region outside of the container. The plurality of vent ports is adapted to maintain isolation of busbars connected to the one or more battery cells.

In embodiments, the elongated slot shape of each of the plurality of vent ports includes an arcuate shape. Optionally, the arcuate shape includes a constant width and is adapted to prevent passage of a human digit through the planar structure into the battery module. In embodiments, the elongated slot shape includes a discorectangular shape. And in some embodiments, the plurality of vent ports are arranged in one or more rows along the planar member.

In some embodiments, the cover further includes one or more shield structures connected to the planar member. Each of the one or more shield structures is disposed adjacent to and covers one or more of the plurality of vent ports. The one or more shield structures form one or more channels with the planar member. The one or more channels are adapted to direct the one or more of gases, heat, pressure, and fire from the one or more battery cells to the predetermined region outside of the container. Optionally, each of the one or more shield structures is integrally formed with the planar member as unitary structure.

In another exemplary embodiment, the present disclosure provides a lid assembly for a battery module. The lid assembly includes a planar member and one or more vent assemblies. The planar member is manufactured from one of a rigid ceramic material and a glass fiber material. The planar member is adapted to be coupled to and enclose a container of the battery module adapted to hold one or more battery cells. The one or more vent assemblies is adapted to communicate one or more of gases, heat, and fire from the one or more battery cells to a predetermined region outside of the container. The one or more vent assemblies each includes one or more vent ports and a shield structure. The one or more vent ports is formed in and extends through the planar member. The shield structure is connected to the planar member. The shield structure is disposed adjacent to and covers the one or more vent ports. The shield structure forms a channel with the planar member.

In embodiments, the one of the rigid ceramic and glass fiber material comprises an electrically and thermally insulating material. And, in embodiments, the one of the rigid ceramic and glass fiber material comprises a mica material. In embodiments, the shield structure is manufactured from a metal.

In embodiments, the shield structure includes a two-level planar structure. The two-level planar structure includes a first planar portion and a second planar portion. The first planar portion is connected to the planar member. The second planar portion is disposed above the one or more vent ports. And the shield structure extends along the planar member and is adapted to deflect and channel the one or more of the gases, the heat, the pressure, and the fire emanating from the one or more vent ports to one or more sides of the cover.

In embodiments, the one or more vent ports are arranged in a row covered by the shield structure and each of the one or more vent ports includes an elongated slot shape. And, in embodiments, each of the vent ports includes an arcuate shape.

In a further exemplary embodiment, the present disclosure provides a battery module. The battery module includes a container and a cover. The container is adapted to hold one or more battery cells. The cover includes a planar member and a plurality of vent ports. The planar member is unitarily formed and manufactured from one of a rigid ceramic material and a glass fiber material. The planar member is adapted to couple to and enclose the container. The plurality of vent ports is formed in the planar member and extends therethrough. Each of the plurality of vent ports includes an elongated slot shape and is positioned in the planar member relative to a position for the one or more battery cells within the container to communicate one or more of gases, heat, pressure, and fire from the one or more battery cells to a predetermined region outside of the container. The plurality of vent ports is adapted to maintain isolation of busbars connected to the one or more battery cells.

In embodiments, the elongated slot shape of each of the plurality of vent ports includes an arcuate shape. Optionally, the arcuate shape includes a constant width and is adapted to prevent passage of a human digit through the planar structure into the battery module. And, in embodiments, the elongated slot shape includes a rectangular shape with rounded ends and the plurality of vent ports are arranged in one or more rows along the planar member.

In embodiments, the cover is a lid assembly and further includes one or more shield structures. The one or more shield structures are connected to the planar member. Each of the one or more shield structures is disposed adjacent to and covers one or more of the plurality of vent ports. The one or more shield structures form one or more channels with the planar member adapted to direct the one or more of gases, heat, pressure, and fire from the one or more battery cells to the predetermined region outside of the container. Optionally, each of the one or more shield structures includes a two-level planar structure. The two-level planar structure includes a first planar portion and a second planar portion. The first planar portion is connected to the planar member. The second planar portion is disposed above the one or more of the plurality of vent ports. Each of the one or more the shield structures extends along the planar member. Each of the one or more shield structures is adapted to deflect and channel the one or more of the gases, the heat, the pressure, and the fire emanating from the one or more of the plurality of vent ports to one or more sides of the cover.

BRIEF DESCRIPTION OF THE DRAWINGS

The present disclosure is illustrated and described with reference to the various drawings, in which like reference numbers are used to denote like assembly components/method steps, as appropriate, and in which.

DESCRIPTION OF EXEMPLARY EMBODIMENTS

Again, the present disclosure generally provides a cover for a battery module. The cover includes a unitarily formed planar member that is formed of one of a ceramic material and a glass fiber material, such as mica. The planar member includes vent ports formed therein adapted to allow any gases/heat/fire vented during a battery cell thermal runaway event to be vented from the battery module. The cover is adapted to electrically isolate the enclosed battery cells, and in particular isolate the busbars of the battery module towards the cover. The cover is also adapted to insulate surrounding structures from heat and fire propagation during a battery cell failure by venting gases released by the battery cells in a controlled manner away from the surrounding structures. By controlling the venting of gases, pressure built up by hot gasses within the battery cells is also released, which prevents damage to the battery module, and in particular, prevents damage to the planar member.

The cover can also include one or more shield structures that are positioned over the vent ports. The one or more shield structures form one or more channels with the planar member to further vent and direct gases/heat/pressure/fire in a controlled manner. This further protects surrounding structures by redirecting the pressurized hot gases away from those structures. By using a unitarily formed planar member with one or more of elongated slots extending therethrough and a shield structure connected thereto, the venting of gases/heat/pressure/fire to control and contain hazardous thermal runaway events can be accomplished efficiently, and in a cost effective manner, which is an improvement over the complexity of other solutions.

Figure 1:
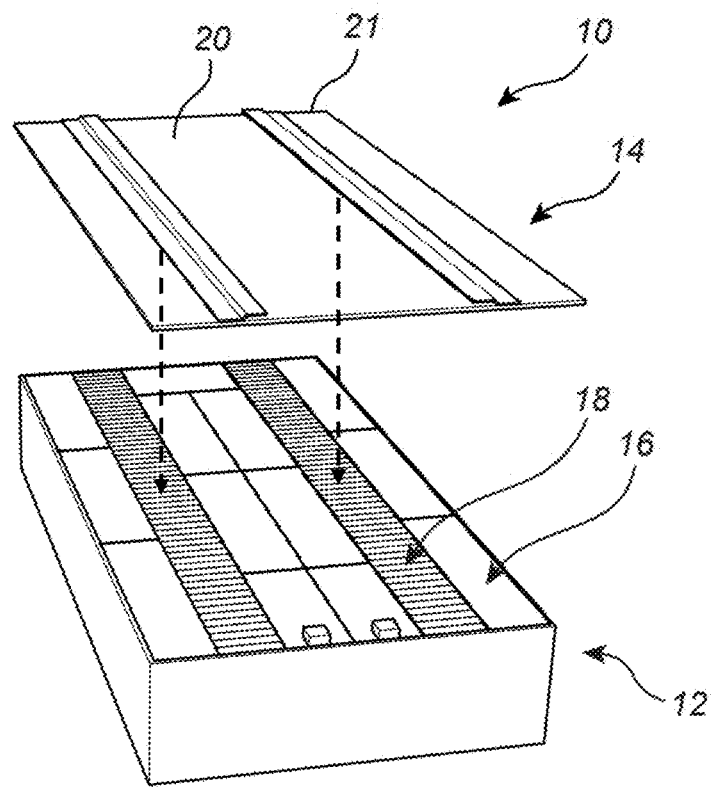
FIG. 1 is an exploded perspective view of one exemplary embodiment of the battery module of the present disclosure, enclosing a plurality of prismatic battery cells and utilizing the cover of the present disclosure.

FIG. 1 is an exploded perspective view of one exemplary embodiment of the battery module 10 including the cover 14 of the present disclosure. Referring now specifically to FIG. 1, in one exemplary embodiment, the battery module 10 of the present disclosure includes a container 12 and a cover 14. The container 12 includes a "box" structure or the like and is configured to enclose and contain one or more prismatic battery cells 16 or the like in a side-by-side and/or stacked configuration. The battery cells 16 may also be cylindrical or pouch battery cells as well. As illustrated, the bus bars or leads 18 of the battery cells 16 are oriented "upwards" along the z-axis, although other suitable orientations may be utilized as well.

The top of the container 12 is closed by the cover 14, both of which may be manufactured from one of a ceramic material and a glass fiber material, such as mica, electrically isolating the enclosed battery cells 16 and the bus bars 18 connected thereto, insulating surrounding structures from heat and fire propagation during a battery cell failure, and, as described in greater detail herein below, venting any gases released by the battery cells 16 in a controlled manner.

The cover 14 includes a planar member 20 that forms the top of the container 12 when the two components are engaged with one another. In embodiments, the cover 14 includes a lip structure 21 around its outer periphery that helps hold the cover 14 securely on the container 12. In some embodiments, the lip structure 21 is integrally formed with the planar member 20 as a unitary structure. Any number of screws, fasteners, straps, or the like may also be used for securing the cover 14 to the container 12, as known to those of ordinary skill in the art. The battery module 10 may be used in an automotive application, for example, or in any other application that utilizes power supplied thereto from a battery cell.

Figure 2:
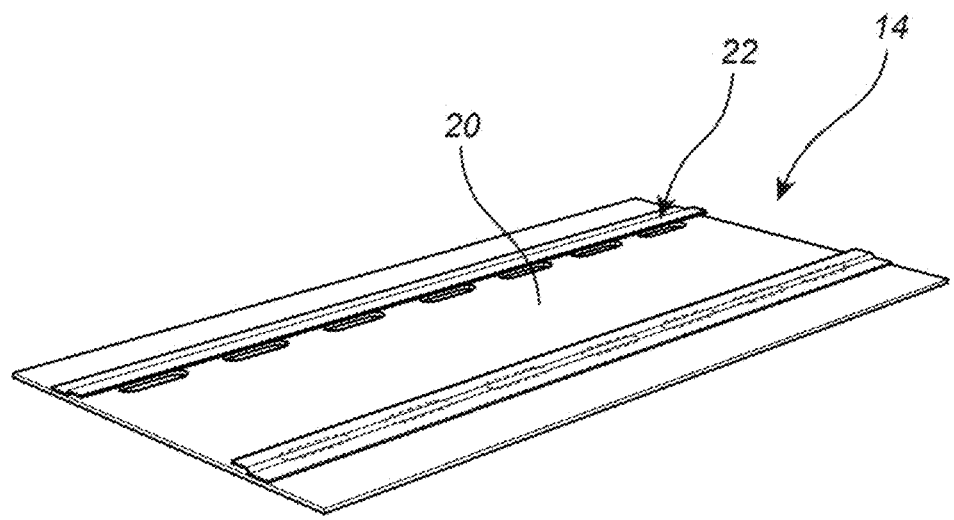
FIG. 2 is a perspective view of one exemplary embodiment of the cover of the present disclosure.

FIG. 2 is a perspective view of one exemplary embodiment of the cover 14 of the present disclosure. Referring now specifically to FIG. 2, again, the cover 14 may be manufactured from a ceramic or glass fiber material, such as mica, and is adapted to electrically isolate the battery cells 16 (FIG. 1) enclosed in the battery module 10 (FIG. 1), insulate surrounding structures from heat and fire propagation during a battery cell failure, and vent any gases released by the battery cells 16 in a controlled manner.

As illustrated in FIG. 2, the cover 14 includes one or more vent assemblies 22 configured and arranged to correspond to the configuration and arrangement of the underlying or adjacent battery cells 16, the bus bars or leads 18 (FIG. 1) connected to the battery cells 16, and/or battery cell vents, such that the vent assemblies 22 provide propagation for gases, heat, pressure, and fire escaping or caused by the battery cells 18 in the event of a thermal runaway event, channeling and directing the gases, heat, and fire as desired and releasing pressure as desired. Accordingly, the configuration and arrangement of the of the vent assemblies 22 is flexible, taking into account the configuration and arrangement of the underlying or adjacent battery cell 16, bus bars or leads 18 and/or battery cell vents, the location of structures surrounding the battery module 10 that it is desirable to protect, and the location of likely individual (i.e., human) access and exposure points associated with the battery module 10. In this respect, the vent assemblies 22 protect the battery module 10 from thermal runaway events by communicating gases from the battery cell vents to the top and/or side of the battery module 10 via the vent assemblies 22 in the cover 14, while also protecting and electrically isolating the bus bars or leads 18 from undesirable contact and exposure. As will be described in greater detail below, this protection of the bus bars or leads 18 from contact and exposure is accomplished by one or more configurations of the vent assemblies 22, such as a sizing of vent ports and a positioning of shield structures.

Figure 3:
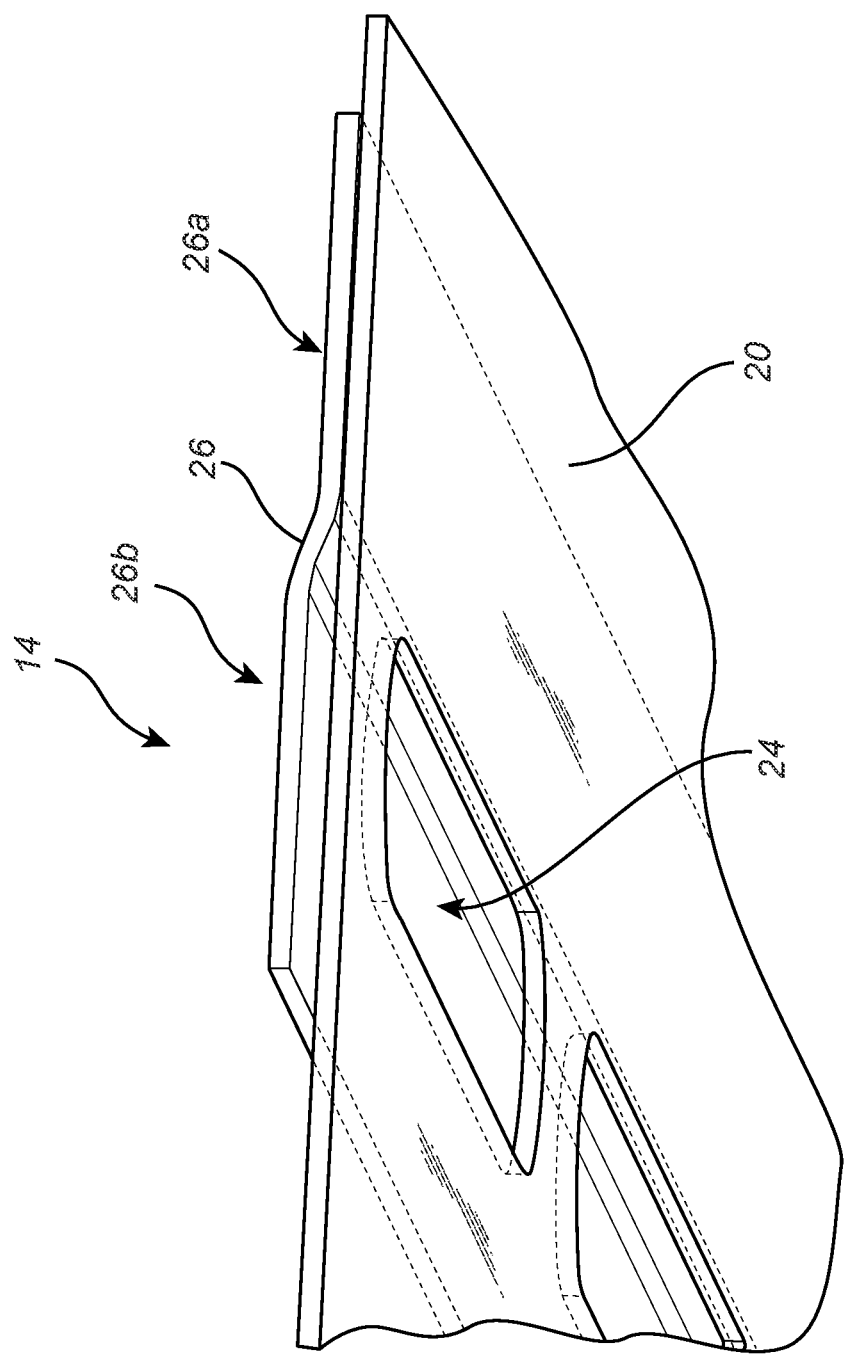
FIG. 3 is a partial perspective view of the cover of FIG. 2, highlighting the associated battery cell vent ports and shield structures.

FIG. 3 is a partial perspective view of the cover 14 of FIG. 2. Referring now specifically to FIG. 3, in one exemplary embodiment, cover 14 is a lid assembly including the planar member 20 and vent assemblies 22. Each of the vent assemblies 22 includes one or more vent ports 24 formed in and by the planar member 20, such that each vent port 24 extends through a thickness of the planar member 20. Each of the vent ports 24 is adapted to provide a fluid/heat communication channel through the planar member 20. As will be described in greater detail below, in some embodiments, each of the vent assemblies 22 also includes a shield structure 26 covering one or more of the vent ports 24.

Again, each vent port 24 is configured and arranged to correspond to the configuration and arrangement of the underlying or adjacent battery cell bus bars or leads 18 (FIG. 1) and/or battery cell vents. In embodiments, each vent port 24 is adapted to overlap with one or more of the underlying or adjacent battery cell bus bars or leads 18 and/or battery cell vents, are adapted to maintain isolation of the busbars, and are adapted to release pressure from the battery cells. In embodiments with multiple vent ports 24, the vent ports 24 may be arranged in one or more rows, one or more columns, or in any similar arrangements.

In embodiments, the vent assemblies 22 are adapted to provide "finger-proofing" to prevent direct human contact with hot components within the battery module 10. This "finger-proofing" is provided by at least one of a shape of the one or more vent ports 24 and a shield structure 26 included in some embodiments of the vent assemblies 22, such as the embodiment illustrated in FIGS. 2 and 3. In embodiments, each of the vent ports 24 includes an elongated slot that is adapted to prevent human digits, such as fingers, from passing therethrough. In the embodiment illustrated in FIGS. 2 and 3, the vent ports 24 each include a slot with an elongated stadium/discorectangle shape that is rectangular with semicircle capped ends. However, as will be discussed below, other shapes are also contemplated.

As can be seen in FIG. 3, in embodiments, each vent port 24 is partially or wholly covered by an adjacent shield structure 26, where the lid assembly includes one or more shield structures 26. This shield structure 26 may be manufactured from the same material as the planar member 20, or from a different material, such as a metal. Any shield structure configuration may be utilized. In the embodiment illustrated in FIG. 3, the shield structure 26 includes an elongate, two-level planar structure. The two-level planar structure includes a first planar portion 26a that is coupled to the planar member 20 and a second planar portion 26b that is disposed above and protects/obstructs the associated vent port(s) 24. With this structure, the vent port(s) prevent human contact with hot components of the battery module 10 by preventing human digits, such as fingers, from reaching the vent port(s) 24.

Further, the vent assemblies 22 are also adapted to direct any gases emanating from the vent port(s) 24. Again, by directing gases emanating from the vent port(s) 24, the vent assemblies 22 provide propagation for gases, heat, and fire escaping the battery cells 18 in the event of a thermal runaway event, channeling and directing the gases, heat, and fire. In the embodiment illustrated in FIG. 3, the shield structure 26 with the two-level planar structure including the first planar portion 26a and the second planar portion 26b forms a channel with the planar member 20 along an outer surface of the planar member 20. The channel is adapted to effectively direct any emanation from the vent port(s) 24 to the side of the battery module 10 (FIG. 1). In embodiments, the venting scheme further utilizes vent pipes that further direct gases and heat emanating from the vent port(s) 24 to a desired location associated with the battery module 10. Such vent pipes may be disposed along the surface of or within the bulk material of the planar member 20, as desired.

Figure 4:
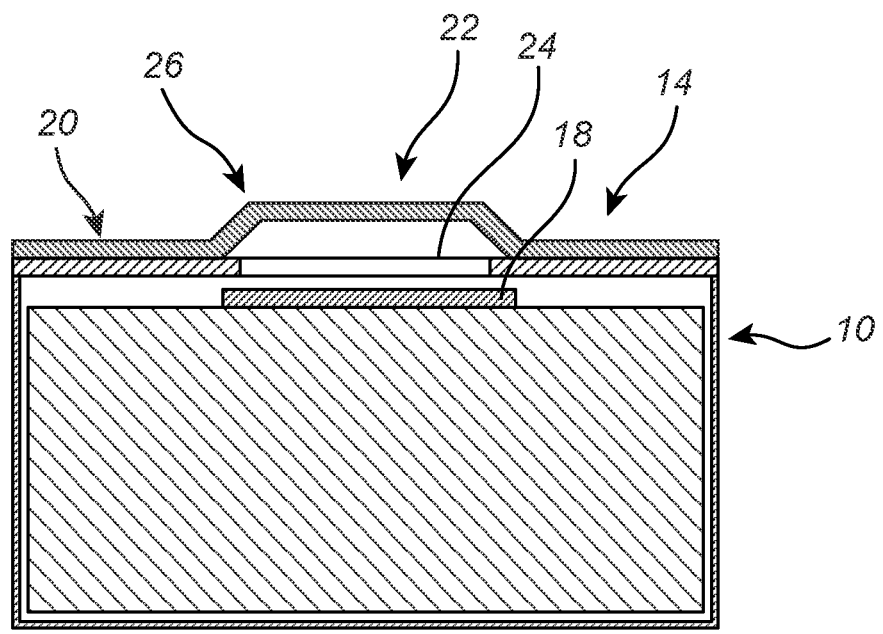
FIG. 4 is a cross-sectional side view of another exemplary embodiment of the battery module of the present disclosure, utilizing a side-venting arrangement for the cover.

FIG. 4 is a cross-sectional side view of another exemplary embodiment of the battery module 10 of the present disclosure, utilizing a side-venting arrangement for the cover. Referring now specifically to FIG. 4, in another exemplary embodiment, each of the vent assemblies 22 used includes one or more vent ports 24 formed in the planar member 20 providing a fluid/heat communication channel internally parallel to the planar member 20. Again, the vent port(s) 24 are configured and arranged to correspond to the configuration and arrangement of the underlying or adjacent battery cell bus bars or leads 18 and/or battery cell vents.

To provide desired "finger-proofing" and direct any gases emanating from the vent port(s) 24, each vent port 24 is partially or wholly covered by the shield structure 26. In this exemplary embodiment, the venting scheme provides a shield structure 26 that is formed integrally with the planar member 20 as a unitary structure and forms a channel therewith to deliver any emanation from the vent port(s) 24 to a desired location associated with the battery module 10, as desired.

Figure 5:
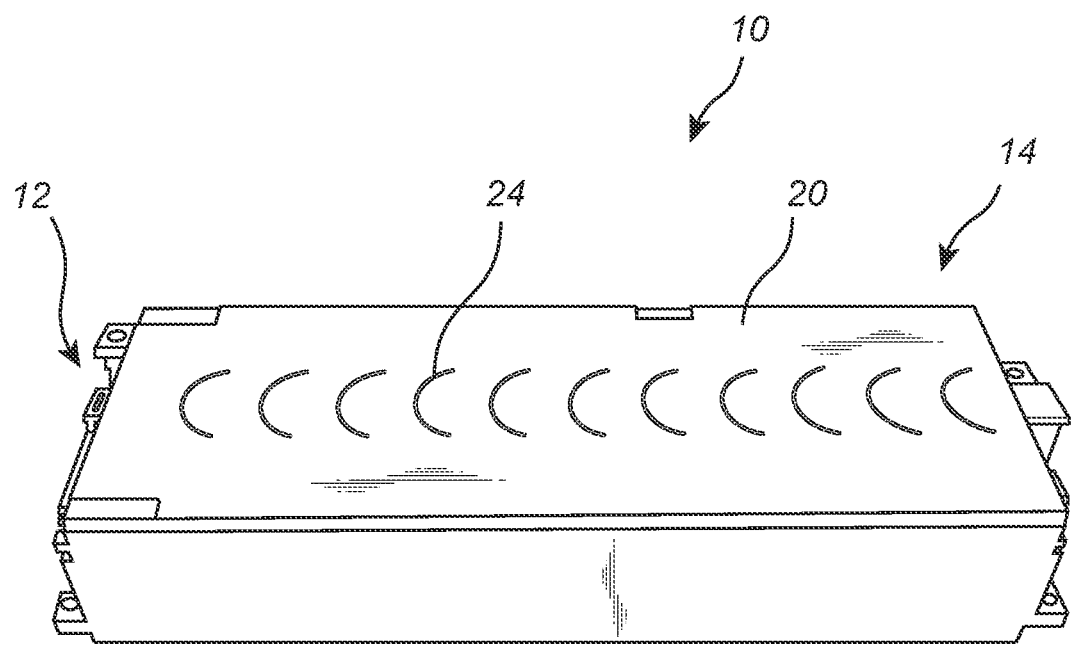
FIG. 5 is a perspective view of another exemplary embodiment of the battery module of the present disclosure.

FIG. 5 is a perspective view of another exemplary embodiment of the battery module 10 of the present disclosure. Referring now specifically to FIG. 5, in another exemplary embodiment, the planar portion 20 includes one or more rows of vent ports 24 formed therein. Each vent port 24 is configured and arranged to correspond to the configuration and arrangement of the underlying or adjacent battery cell bus bars or leads 18 (FIG. 1) and/or battery cell vents. In embodiments, each vent port 24 is adapted to overlap with one or more of the underlying or adjacent battery cell bus bars or leads 18 and/or battery cell vents.

Each of the vent ports 24 is sized and shaped to provide "finger-proofing" to prevent direct human contact with hot components within the battery module 10 and to direct gases, heat, and fire in a controlled manner from the battery module 10 to protect and insulate components adjacent thereto.

In embodiments, each vent port 24 includes an elongated slot shape. In the embodiment illustrated in FIG. 5, each vent port 24 includes an arcuate shape that is a minor arc having a central angle less than or equal to 180 degrees. Further, in the embodiment illustrated, each elongated slot shape includes a constant width with rounded ends. However, other shapes, other arcuate shapes with other arc lengths, variable widths, such as a crescent shape, and the like are also contemplated. In the embodiment illustrated, the vent ports 24 are aligned such that a concavity of each vent port 24 is facing an adjacent vent port 24, the endpoints of the vent ports 24 are aligned, and the midpoints, of the vent ports 24 are aligned. However, other orientations and configurations of the vent ports 24 are also considered.

Thus, the present disclosure provides an improved cover for a battery module. The planar member is integrally manufactured from a ceramic or glass fiber material, such as mica with vent ports therein that allow any gases/heat/fire vented during a battery cell thermal runaway event to be vented, which insulates surrounding structures from the hot pressurized gases and allows the heat and pressure to be released from the battery cells protecting the integrity of the battery module, and in particular the integrity of the cover, while maintaining electrical isolation of the battery cells enclosed thereby, and in particular, maintains isolation of the busbars connecting to the battery cells.

The present disclosure further provides a shield structure of the cover that is positioned over one or more of the vent ports formed in the planar member and that forms a channel with the planar member, which further insulates surrounding structures from the hot pressurized gases released from the battery cells, further controlling the release of the hot pressurized gases.

By controlling venting from the battery module, the hazards of a thermal runaway event can be controlled/contained at the battery module level, rather than merely at the battery cell level to better control and contain the hazardous conditions resulting therefrom. By using a unitarily formed planar member with one or more of elongated slots and a shield structure, this control and containment of hazardous thermal runaway events can be accomplished efficiently, and in a cost effective manner, which is an improvement over the complexity of other solutions.

Although the present disclosure is illustrated and described with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A cover for a battery module, the cover comprising:
a unitarily formed planar member manufactured from one of a rigid ceramic material and a glass fiber material, the unitarily formed planar member being adapted to couple to a container for holding one or more battery cells and enclose the one or more battery cells and connected bus bars or leads;
a plurality of vent ports formed in the unitarily formed planar member and extending therethrough, the plurality of vent ports configured and arranged to correspond to a configuration and arrangement of the bus bars or leads enclosed by the unitarily formed planar member, each of the plurality of vent ports including an elongated slot shape being positioned in the unitarily formed planar member relative to a position for the one or more battery cells in the container to communicate one or more of gases, heat, pressure, and fire from the one or more battery cells to a predetermined region outside of the container, the plurality of vent ports adapted to maintain isolation of the enclosed busbars and leads connected to the one or more battery cells; and
two shield structures each comprising:
a first planar structure connected to the unitarily formed planar member adjacent to one or more of the plurality of vent ports and an integrally formed parallel second planar structure covering the one or more of the plurality of vent ports to form a channel on an outer surface of the unitarily formed planar member adjacent to the one or more of the plurality of vent ports that is open towards a center of the unitarily formed planar member and another of the two shield structures.

2. The cover of claim 1, wherein the elongated slot shape of each of the plurality of vent ports includes an arcuate shape.

3. The cover of claim 2, wherein the arcuate shape includes a constant width and is adapted to prevent passage of a human digit through the unitarily formed planar member into the battery module.

4. The cover of claim 1, wherein the elongated slot shape includes a discorectangular shape.

5. The cover of claim 1, wherein the plurality of vent ports are arranged in one or more rows along the unitarily formed planar member.

6. The cover of claim 1, wherein each channel is adapted to direct the one or more of gases, heat, pressure, and fire from the one or more battery cells to the predetermined region outside of the container.

7. The cover of claim 1, wherein the channel formed by the first planar structure and the parallel second planar structure has a side that is open opposite the first planar structure.

8. A lid assembly for a battery module, the lid assembly comprising:
a planar member manufactured from one of a rigid ceramic material and a glass fiber material, the planar member adapted to be coupled to a container of the battery module adapted to hold one or more battery cells and enclose the one or more battery cells and connected bus bars or leads; and
one or more vent assemblies adapted to communicate one or more of gases, heat, and fire from the one or more battery cells to a predetermined region outside of the container, the one or more vent assemblies each including
a plurality of vent ports formed in and extending through the planar member, the a plurality of vent ports configured and arranged to correspond to a configuration and arrangement of the bus bars or leads enclosed by the planar member, and
two shield structure members each comprising:
a first planar structure connected to the planar member adjacent to one or more of the plurality of vent ports and an integrally formed parallel second planar structure covering the one or more of the plurality of vent ports to form a channel on an outer surface of the planar member adjacent to the one or more of the plurality of vent ports that is open towards a center of the planar member and another of the two shield structure members.

9. The lid assembly of claim 8, wherein the one of the rigid ceramic and glass fiber material comprises an electrically and thermally insulating material.

10. The lid assembly of claim 8, wherein the one of the rigid ceramic and glass fiber material comprises a mica material.

11. The lid assembly of claim 8, wherein the two shield structure members are adapted to deflect and channel the one or more of the gases, the heat, the pressure, and the fire emanating from the one or more vent ports to the center of the planar member.

12. The lid assembly of claim 8, wherein the first planar structure and the integrally formed parallel second planar structure are each manufactured from a metal.

13. The lid assembly of claim 8, wherein the one or more vent ports are arranged in a row covered by the two shield structure members and each of the one or more vent ports includes an elongated slot shape.

14. The lid assembly of claim 8, wherein each of the vent ports includes an arcuate shape.

15. A battery module, comprising:
a container adapted to hold one or more battery cells; and
a cover comprising:
a unitarily formed planar member manufactured from one of a rigid ceramic material and a glass fiber material, the unitarily formed planar member being adapted to couple to the container and enclose the one or more battery cells and connected bus bars or leads;
a plurality of vent ports formed in the unitarily formed planar member and extending therethrough, the plurality of vent ports configured and arranged to correspond to a configuration and arrangement of the bus bars or leads enclosed by the unitarily formed planar member, each of the plurality of vent ports including an elongated slot shape being positioned in the unitarily formed planar member relative to a position for the one or more battery cells in the container to communicate one or more of gases, heat, pressure, and fire from the one or more battery cells to a predetermined region outside of the container, the plurality of vent ports adapted to maintain isolation of the enclosed busbars and leads connected to the one or more battery cells; and
two shield structures each comprising:
a first planar structure connected to the unitarily formed planar member adjacent to one or more of the plurality of vent ports and an integrally formed parallel second planar structure covering the one or more of the plurality of vent ports to form a channel on an outer surface of the unitarily formed planar member adjacent to the one or more of the plurality of vent ports that is open towards a center of the unitarily formed planar member and another of the two shield structures.

16. The battery module of claim 15, wherein the elongated slot shape of each of the plurality of vent ports includes an arcuate shape.

17. The battery module of claim 16, wherein the arcuate shape includes a constant width and is adapted to prevent passage of a human digit through the unitarily formed planar member into the battery module.

18. The battery module of claim 15, wherein the elongated slot shape includes a rectangular shape with rounded ends and the plurality of vent ports are arranged in one or more rows along the unitarily formed planar member.

19. The battery module of claim 15, wherein each of the channels is adapted to direct the one or more of gases, heat, pressure, and fire from the one or more battery cells to the predetermined region outside of the container.

20. The battery module of claim 15, wherein the channel formed by the first planar structure and the parallel second planar structure has a side that is open opposite the first planar structure.

* * * * *